(No Model.)

J. F. LONERGAN.
GREASE CUP.

No. 417,430. Patented Dec. 17, 1889.

WITNESSES:
P. H. Eagle.
L. Douville.

INVENTOR:
James F. Lonergan
BY John A. Wiedersheim
ATTORNEY.

UNITED STATES PATENT OFFICE.

JAMES F. LONERGAN, OF PHILADELPHIA, PENNSYLVANIA.

GREASE-CUP.

SPECIFICATION forming part of Letters Patent No. 417,430, dated December 17, 1889.

Application filed June 10, 1889. Serial No. 313,681. (No model.)

*To all whom it may concern:*

Be it known that I, JAMES F. LONERGAN, a citizen of the United States, residing in the city and county of Philadelphia, State of Pennsylvania, have invented a new and useful Improvement in Grease-Cups, which improvement is fully set forth in the following specification and accompanying drawings.

My invention consists of a grease-cup having a screw for adjusting the tension of a spring which bears upon a piston or plunger, the latter being adapted to be in contact with the grease in the cup, said screw being formed with threads of such pitch that quick motions may be imparted to the screw.

It also consists in providing the neck or shell of the cup with a latch, which is adapted to engage with a recess or groove in the adjusting-screw, so as to hold the latter immovably in position.

It further consists in forming the stem of the piston or plunger in such manner that the plug or valve at the base of the cup is accessible through said stem for purposes of adjustment without disturbing the parts of the device.

It also consists of the combination of parts as herein set forth and claimed.

Figure 1:
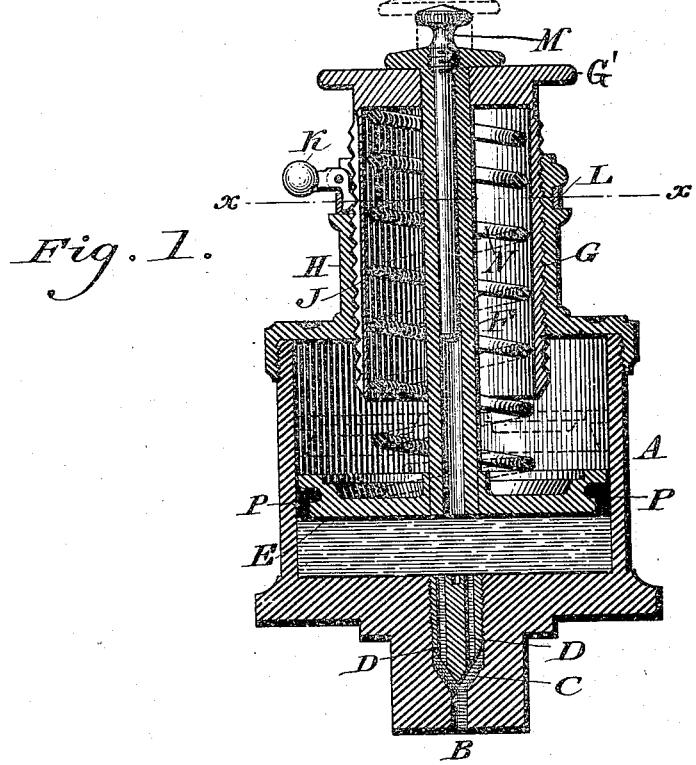
Figure 2:
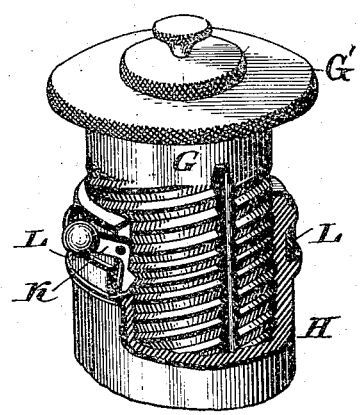
Figure 3:
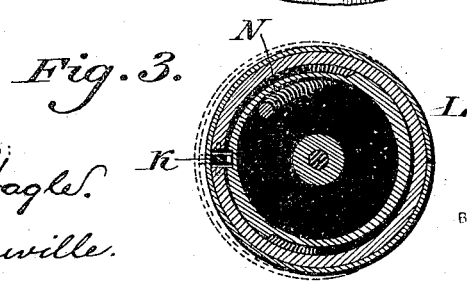

Figure 1 represents a vertical section of a grease-cup embodying my invention. Fig. 2 represents a perspective view, partly broken away, of a portion thereof. Fig. 3 represents a horizontal section on line *x x*, Fig. 1.

Similar letters of reference indicate corresponding parts in the several figures.

Referring to the drawings, A designates the body of a grease-cup having at bottom an outlet B, within which is seated a valve C, consisting of a rotatable screw-plug, which is provided with ports D, whereby by raising or lowering said valve the extent of discharge of grease may be adjusted. Within the body A is a piston or plunger E, to which is attached a hollow stem F, the latter passing upwardly within a hollow screw G, which latter engages with the neck or upper portion II of the body A, said stem also passing freely through the head of the screw, whereby it is accessible at the top of the cup. In the outer periphery of the screw G is a vertical groove or recess J, with which engages the nose of a handled and gravitating latch K, the latter being pivoted to the upper end of the neck II, and having bearing against its nose a spring L, consisting of a split ring or band of suitable material, the same encircling said neck and occupying a recess therein. Within the stem F is a pin M, which closes the bore of said stem, and is screw-threaded so as to engage with the head of said stem, whereby the pin is held in position, and may be removed when desired. Encircling the stem F is a coiled spring N, the lower end of which bears against the piston E and the upper end whereof bears against the head of the screw G. Encircling the piston E is packing P, which occupies a recess in said piston, it being noticed that the diameter of the piston below said recess is reduced and the packing is in contact with the grease, whereby when the piston presses against the grease the packing is expanded and compressed against the inner wall of the body, thus producing a tight joint, whereby the grease is prevented from escaping upwardly around the piston. The threads of the screw G are two in number and extend parallel with each other, the pitch of said threads being "rapid," by which provision quick rising and falling motions may be imparted to the screw when the same is rotated. It will be seen that when the body A is supplied with grease the piston is located within said body in the grease, it being noticed that the upper portion II of the body is removable. The latch K is thrown out and the screw is fitted in position and rotated, whereby as it descends the spring N is contracted so that its pressure is exerted on the piston, and the stem F rises through the head of the screw G as the screw continues to be rotated, as shown by the dotted lines, Fig. 1. When the screw occupies the desired position, the latch K is let go and its nose enters the groove J, so that the screw G is locked and change of its adjustment prevented. As the grease is discharged from the body through the outlet B, the piston E follows the same, and under action of the spring N, which expands, continues to exert pressure on the grease, so that the grease is forced from the body uniformly and reliably. Should the valve C require adjustment, the pin M is removed and a screw-driver or other suitable implement passed through the tubular stem F and engaged in a recess in the head of the valve, so that the latter may be rotated and thereby raised or lowered, as the case may be, this being accomplished without disturbing the other parts of the cup. When the pin is in position, it closes the bore of the stem F and prevents the escape of grease therethrough.

Having thus described my invention, what I claim as new, and desire to secure by Letters Patent, is—

1. A grease-cup having a piston, a spring bearing against the same, a screw which is fitted to the body of the cup, and a latch or catch mounted on the body and engaging in a recess or groove in the screw, substantially as described.

2. A grease-cup having a hollow screw fitted in the neck thereof and provided with a piston with hollow stem working in the head of said screw, and a spring bearing on the said piston and head of the screw, said parts being combined substantially as described.

3. A grease-cup having an outlet in the bottom thereof, a valve with ports in said outlet, a piston with hollow stem, and a removable pin or plug in said hollow stem, adapted to close the same, said hollow stem and valve being in line, said parts being combined substantially as and for the purpose set forth.

4. A grease-cup having a hollow screw in the neck thereof, and a piston with hollow stem working in the head of said screw, the said screw having two external parallel threads of rapid pitch, said parts combined substantially as and for the purpose set forth.

JAMES F. LONERGAN.

Witnesses:
JOHN A. WIEDERSHEIM,
JAMES F. KELLY.